May 15, 1945.  W. C. PETERSEN ET AL  2,376,181
CABLE LIFT FRAME ASSEMBLY FOR TRACTORS
Filed July 21, 1943  2 Sheets-Sheet 1

Inventor
Martin G. Kuch
Walter C. Petersen
By
Attorney

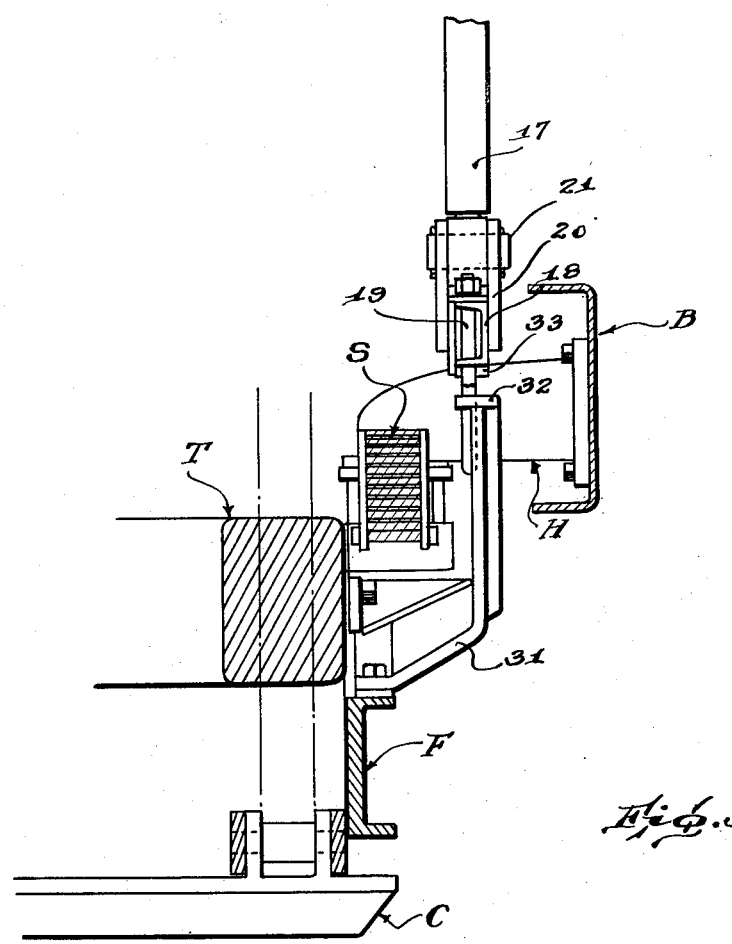

Patented May 15, 1945

2,376,181

UNITED STATES PATENT OFFICE 2,376,181

CABLE LIFT FRAME ASSEMBLY FOR TRACTORS

Walter C. Petersen and Martin G. Kuch, Findlay, Ohio, assignors to The Buckeye Traction Ditcher Company, Findlay, Ohio, a corporation of Ohio Application July 21, 1943, Serial No. 495,652

3 Claims. (Cl. 37—144)

This invention relates to bulldozers, trailbuilders and the like in which a tractor is equipped with an earth working implement at the front end which is adapted to be raised and lowered relative to the work, and an object is to produce a new and improved cable lift frame for tractors which can be readily and conveniently mounted upon the tractor and which, in cooperation with the usual hoist mounted on the tractor, can receive and guide the cable employed for raising and lowering the earth working implement with respect to the ground surface.

Another object is to produce a cable lift frame assembly which is readily demountable, can be conveniently packaged for transportation or shipment and which, when installed upon the tractor, can effectively withstand the stresses and strains to which it is subjected in use.

A further object is to produce a relatively simple and inexpensive structure of the above character which can be readily attached to or disengaged from the tractor body and which is designed to relieve the tractor springs of excessive load to which they may be subjected during the hoisting of the earth working implement.

Figure 1:
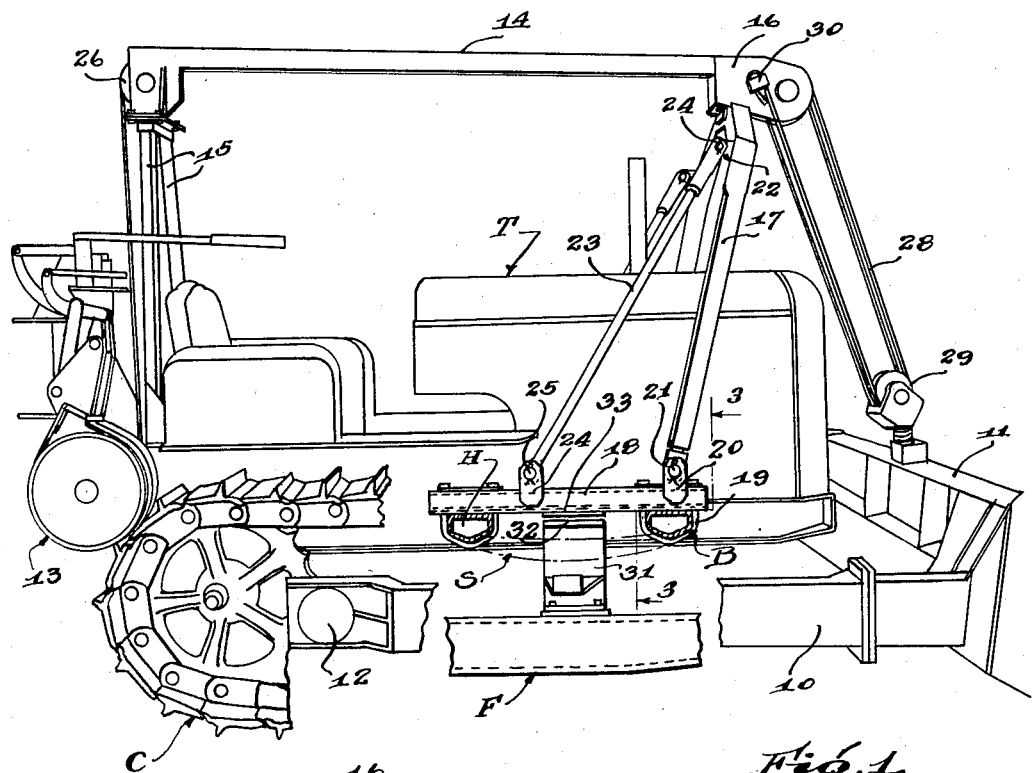
Figure 2:
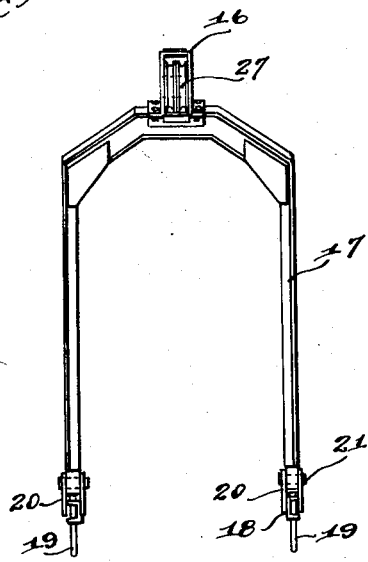

Other objects and advantages of the invention will hereinafter appear and for purposes of illustration but not of limitation, an embodiment of the invention is shown in the accompanying drawings in which Figure 1 is a side elevation of the cable lift frame mounted on a tractor, the latter being shown in outline;

Figure 2 is a front end view of the cable lift frame removed from the tractor; and Figure 3 is an enlarged sectional view substantially on the line 3—3 of Figure 1 showing the lower portion of the frame and its mounting upon the tractor frame and also the bracket on the traction frame of the tractor providing a stop for cooperating with the horizontal attaching bar of the lift frame assembly.

The illustrated embodiment of the invention comprises a tractor T, which has crawler units C on opposite sides, the frame of the crawler or traction units being indicated at F and the frame of the tractor being indicated at B. The tractor frame B is supported on the traction frame F by leaf springs indicated at S, the latter engaging a pair of laterally projecting horns or brackets H which project outwardly from the tractor body B.

Side beams 10 of a bulldozer 11 are pivoted at their rear ends on trunnions 12 on the traction frame F. Mounted at the rear of the tractor is a cable drum hoist designated by the numeral 13, the same being power driven by the tractor as will be readily understood.

Extending lengthwise of the tractor T and spaced above the same is a hollow beam 14, the rear end of which is supported by a pair of upright legs 15 to which the beam 14 is bolted. The lower ends of the upright legs 15 are suitably bolted to the tractor frame B. Welded to the front end of the beam 14 is a sheave housing 16, to the underside of which is bolted an inverted U frame 17, the legs of which straddle the tractor and incline downwardly and rearwardly from the housing 16 to a horizontal attaching beam 18 which is detachably secured to the adjacent horns H by U bolts 19. Welded to the forward end portion of the attaching beam 18 is a bracket 20 which receives a pin 21 for connecting the adjacent arm of the U frame 17, the pin being held in place by a pair of cotter pins enabling the parts to be readily connected or disconnected.

Extending rearwardly from the upper end of each of the arms of the U frame 17 is a bracket 22 to which the upper end of a brace rod 23 is connected by a pin 24. The pin 24 is held in place by cotter pins to enable it to be readily assembled. Each brace rod 23 inclines downwardly and rearwardly to the mounting beam 18 at a point rearwardly of the bracket 20. The lower end of each brace rod 23 is connected to an integral upstanding bracket 24 by a pin 25 held in place by suitable cotter pins. In this manner the lift frame is effectively braced and the thrust imparted by it properly distributed.

At the rear end of the longitudinal beam 14 is a cable sheave 26 and within the sheave housing 16 at the front end of the beam 14 is a pair of sheaves 27. It will be manifest that the cable 28 from the hoist 13 passes upwardly over the sheave 26, thence through the beam 14, around one of the sheaves 27, downwardly to a sheave assembly 29 carried by the bulldozer, to the other sheave 27, thence downwardly about another of the sheaves in the assembly 29, the end of the cable being dead-ended at 30 on the sheave housing 16. In this manner, the bulldozer 11 can be raised from its central area and the pull of the cable is transmitted through the uprights 15, U frame 17 and brace rods 23 and finally through the attaching beam 18 to the tractor frame.

In some instances, the load imposed upon the tractor frame due to hoisting of the bulldozer is greater than the springs S can satisfactorily endure. To militate against injury or damage to the springs S, a bracket 31 is bolted to the crawler or traction frame of the tractor. At the upper end of the bracket 31 is a stop plate 32 which is spaced downwardly from a stop plate 33 on the underside of the adjacent attaching beam 18. In the event that the load imposed upon the tractor body B exceeds a predetermined maximum, the stop plate 33 is moved in contact with the stop plate 32 thereby limiting the load imposed upon the tractor springs.

It will be manifest that the above cable lift frame assembly is simple and economical to manufacture and can be readily assembled or disassembled and conveniently applied to the tractor. The features of compactness for transportation and packaging are important.

It is to be understood that numerous changes in details of construction, arrangement and operation may be effected without departing from the spirit of the invention especially as defined in the appended claims.

What we claim is:

1. A cable lift frame assembly for tractors having a spring mounting for the tractor frame upon the traction frame, said assembly comprising a beam extending lengthwise of and above the tractor, an upright for supporting the rear end of said beam, an inverted U-frame connected at its upper end to the front end of said beam and straddling the tractor, an attaching beam on each side of the tractor connected to the frame of the tractor, a stop on the traction frame engageable with the attaching beam in the event that the spring mounting for the tractor frame is depressed beyond a predetermined extent, sheaves at the front and rear ends of said first beam, and a cable passing over said sheaves for connection to a cable driven at the rear of the tractor and an earth working implement at the front of the tractor.

2. A cable lift frame for tractors having a spring mounting for the tractor frame upon the traction frame, said assembly comprising a beam extending lengthwise of and above the tractor, an upright separably connected to the rear end of the beam, an inverted U-frame separably connected at its upper end to the front end of said beam, straddling the tractor and inclining downwardly and rearwardly from said beam, a horizontally disposed attaching beam separably connected to the tractor frame, a separable connection between the lower end of each arm of the U-frame and the adjacent attaching beam, a brace rod for each side of the U-frame separably connected at the top to an upper part of the U-frame and at the bottom to the adjacent attaching beam rearward of the U-frame, a stop plate on the under side of each attaching beam, a bracket on opposite sides of the traction frame of the tractor having a stop arranged beneath the adjacent stop plate whereby depression of the spring mounting beyond a predetermined extent causes the stop plate to engage the stop, sheaves on opposite ends of said first beam, and a cable passing over said sheaves for connection to a cable drum at the rear of the tractor and an earth working implement at the front of the tractor.

3. A cable lift frame for tractors of the type having on each side a pair of outwardly projecting horns spaced longitudinally thereof, said frame comprising a beam extending lengthwise of and above the tractor, an upright for the rear end of the beam, an inverted U-frame for the front end of the beam straddling the tractor and inclining downwardly and rearwardly from the front end of said beam, a horizontal attaching beam for each side of the tractor resting respectively on the adjacent pair of horns, means for securing said attaching beams to said horns respectively, a pair of brackets on each attaching beam and spaced from each other, a detachable connection between the front bracket of each pair and the adjacent leg of said U-frame, a brace rod for each leg of said U-frame inclining downwardly and rearwardly to the adjacent attaching beam, and a detachable connection between each brace rod and the respective rear bracket, and cable sheaves at the front and rear ends of said first beam respectively.

WALTER C. PETERSEN.
MARTIN G. KUCH.